US010072220B2

(12) United States Patent
Marion et al.

(10) Patent No.: US 10,072,220 B2
(45) Date of Patent: Sep. 11, 2018

(54) PROCESS FOR ELIMINATING ARSENIC FROM A HYDROCARBON FEED

(71) Applicant: IFP ENERGIES NOUVELLES, Rueil-Malmaison (FR)

(72) Inventors: Marie-Claire Marion, Vernaison (FR); Philibert Leflaive, Mions (FR); Annick Pucci, Croissy sur Seine (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 971 days.

(21) Appl. No.: 14/306,308

(22) Filed: Jun. 17, 2014

(65) Prior Publication Data

US 2014/0374321 A1 Dec. 25, 2014

(30) Foreign Application Priority Data

Jun. 21, 2013 (FR) .................................. 13 55932

(51) Int. Cl.
| | | |
|---|---|---|
| *C10G 65/04* | (2006.01) | |
| *B01J 20/06* | (2006.01) | |
| *B01J 23/883* | (2006.01) | |
| *C10G 45/08* | (2006.01) | |
| *B01J 37/04* | (2006.01) | |
| *B01J 37/20* | (2006.01) | |
| *B01J 37/28* | (2006.01) | |
| *B01J 23/85* | (2006.01) | |
| *B01J 20/08* | (2006.01) | |
| *B01J 20/32* | (2006.01) | |
| *B01J 35/00* | (2006.01) | |
| *B01J 37/02* | (2006.01) | |
| *B01J 29/076* | (2006.01) | |
| *B01J 35/10* | (2006.01) | |

(52) U.S. Cl.
CPC .............. *C10G 65/04* (2013.01); *B01J 20/06* (2013.01); *B01J 20/08* (2013.01); *B01J 20/3204* (2013.01); *B01J 20/3236* (2013.01); *B01J 23/85* (2013.01); *B01J 23/883* (2013.01); *B01J 37/04* (2013.01); *B01J 37/20* (2013.01); *B01J 37/28* (2013.01); *C10G 45/08* (2013.01); *B01J 29/076* (2013.01); *B01J 35/0006* (2013.01); *B01J 35/1014* (2013.01); *B01J 35/1019* (2013.01); *B01J 35/1038* (2013.01); *B01J 35/1042* (2013.01); *B01J 35/1047* (2013.01); *B01J 37/0201* (2013.01); *B01J 37/0205* (2013.01); *C10G 2300/205* (2013.01)

(58) Field of Classification Search
CPC ........ B01J 20/06; B01J 20/08; B01J 20/3204; B01J 20/3236; B01J 23/85; B01J 23/883; B01J 29/076; B01J 35/0006; B01J 35/1014; B01J 35/1019; B01J 35/1038; B01J 35/1042; B01J 35/1047; B01J 37/0201; B01J 37/20; B01J 37/28; C10G 2300/205; C10G 45/08; C10G 65/04
See application file for complete search history.

(56) References Cited

U.S. PATENT DOCUMENTS

| | | | |
|---|---|---|---|
| 4,153,540 A | 5/1979 | Gorring et al. | |
| 8,394,262 B2 | 3/2013 | Guichard et al. | |
| 2003/0111391 A1* | 6/2003 | Bhan .................... | B01J 23/85 |
| | | | 208/253 |
| 2006/0231456 A1 | 10/2006 | Bhan | |
| 2009/0139901 A1* | 6/2009 | Picard ................. | C10G 65/04 |
| | | | 208/211 |
| 2010/0155301 A1 | 6/2010 | Guichard et al. | |

FOREIGN PATENT DOCUMENTS

| | | |
|---|---|---|
| EP | 2255873 A2 | 12/2010 |
| FR | 2673191 A1 | 8/1992 |

OTHER PUBLICATIONS

Search Report related to corresponding French Application No. 13/55932 dated Mar. 5, 2014.

* cited by examiner

*Primary Examiner* — In Suk C Bullock
*Assistant Examiner* — Derek N Mueller
(74) *Attorney, Agent, or Firm* — Millen, White, Zelano & Branigan P.C.

(57) ABSTRACT

The invention of the current application is a process for eliminating arsenic from a hydrocarbon feed which is at least partially liquid, including steps a and b.
Step a includes bringing the hydrocarbon feed and hydrogen into contact with a first capture mass including a support and at least one metal M1 from group VIB and at least two metals M2 and M3 from group VIII.
Step b includes bringing the hydrocarbon feed and hydrogen into contact with a second capture mass in the sulphide form including a support and nickel, the quantity of nickel being at least 5% by weight of NiO with respect to the total weight of the second capture mass.
Step a) is either carried out before step b) or carried out simultaneously with step b).

12 Claims, No Drawings

PROCESS FOR ELIMINATING ARSENIC FROM A HYDROCARBON FEED

The present invention relates to a process for eliminating, by capture, the arsenic present in a hydrocarbon feed.

PRIOR ART

Depending on its origin, crude oil may contain small quantities of metallic compounds, generally present in the form of organometallic complexes.

Organometallic compounds of this type are poisonous to the catalysts used in oil transformation processes. In particular, they poison hydrotreatment and hydrogenation catalysts by being gradually deposited on the active surface of such catalysts. Metallic compounds are primarily found in heavy cuts originating from the distillation of crude oil (nickel, vanadium, arsenic, mercury) or in natural gas condensates (mercury, arsenic).

Treatment by thermal or catalytic cracking of hydrocarbon cuts, for example steam cracking, into lighter and olefinic or aromatic hydrocarbon cuts, allows the removal of certain metals (for example nickel, vanadium, etc.). In contrast, certain other metals, in particular arsenic, which are susceptible of forming volatile compounds, are found at least in part in the lighter cuts and because of this, can poison the catalysts for the processes for the transformation of such cuts, such as selective hydrogenation or hydrodesulphurization catalysts.

Some earlier processes are known for eliminating arsenic from hydrocarbons in the liquid phase: in particular, the processes are carried out in the presence of solid masses which are variously known as: adsorption masses, capture masses, trapping masses, extraction masses, or metal transfer masses. As an example, patent U.S. Pat. No. 4,046,674 describes a process for the dearsenification of shale oil using a capture mass comprising nickel and molybdenum in the form of sulphides deposited on a support, for example an alumina.

In order to eliminate arsenic from a hydrocarbon feed, patent application FR 2 617 497 recommends carrying out a process in which the feed and hydrogen are passed over and brought into contact with a capture mass comprising nickel, of which at least 50% by weight is in the metallic state, at a temperature of 110° C. to 280° C., at a pressure of 1 to 100 bars (0.1-10 MPa).

Patent application FR 2 617 497 discloses a process for the elimination of arsenic from liquid hydrocarbon feeds at a temperature in the range 0° C. to 100° C., at low pressure, in the total absence of hydrogen and in the presence of a capture mass containing at least one sulphide or an oxide of copper deposited on a support.

However, refiners still need dearsenification processes which are efficient and which employ as little capture mass as possible. One of the aims of the invention is to propose an efficient alternative dearsenification process which can in particular be operated with as high a flow rate of the feed to be treated as possible.

SUMMARY OF THE INVENTION

The invention concerns a process for the elimination of arsenic from a hydrocarbon feed which is at least partially liquid at ambient temperature and at atmospheric pressure, comprising at least the following steps:
a) bringing the hydrocarbon feed and hydrogen into contact with a first capture mass comprising a support and at least one metal M1 from group VIB and at least two metals M2 and M3 from group VIII, the molar ratio of the metals (M2+M3)/M1 being in the range 1 to 6, the quantity of metal M1 from group VIB in the oxide form being in the range 3% to 14% by weight with respect to the total weight of the first capture mass, the quantity of metal M2 from group VIII in the oxide form being in the range 1% to 20% by weight with respect to the total weight of the first capture mass and the quantity of metal M3 from group III in the oxide form being in the range 5% to 28% by weight with respect to the total weight of the first capture mass;
    the contact of step a) being carried out at a temperature in the range 30° C. to 400° C., at a pressure in the range 0.2 to 5 MPa, with an hourly space velocity with respect to the volume of the first capture mass in the range 4 to 50 $h^{-1}$ and with a hydrogen flow rate in the range 2 to 800 litres per litre of feed;
b) bringing the hydrocarbon feed and hydrogen into contact with a second capture mass in the sulphide form comprising a support and nickel, the quantity of nickel being at least 5% by weight of NiO with respect to the total weight of the second capture mass in the oxide form before sulphurization;
    the contact of step b) being carried out at a temperature in the range 30° C. to 400° C., at a pressure in the range 0.2 to 5 MPa, with an hourly space velocity with respect to the volume of the second capture mass in the range 4 to 50 $h^{-1}$ and with a hydrogen flow rate in the range 2 to 800 litres per litre;
    and in which step a) is either carried out before step b) or carried out simultaneously with step b).

Surprisingly, the Applicant has established that the specific concatenation of capture masses or using a mixture of the capture masses mentioned above can eliminate arsenic in a particularly effective manner and with hourly space velocities with respect to the volumes of the capture masses which are high, i.e. more than 4 $h^{-1}$, preferably more than 6 $h^{-1}$, or even more than 10 $h^{-1}$. The process of the invention can thus be used to produce effluents with a low arsenic content by using a smaller quantity of catalysts for the same flow rate of the feed to be treated; this is of substantial importance from the point of view of savings when running a refinery.

In one embodiment, step a) is carried out before step b) and said steps are carried out in a first and a second reaction zone respectively included in a first and second reactor. In this case, the reactors can be operated in fixed bed, moving bed or ebullated bed mode.

Alternatively, when step a) is carried out before step b), said steps are respectively carried out in a first and a second reaction zone included in the same fixed bed reactor.

In another embodiment, step a) is carried out simultaneously with step b) and said steps are carried out in a reactor including a reaction zone comprising a mixture of the first and second capture masses.

Preferably, the quantity of metal M1 is in the range 3% to 12% by weight, the quantity of metal M2 is in the range 1% to 15% by weight and the quantity of metal M3 is in the range 5% to 18% by weight with respect to the total weight of the first capture mass.

Preferably, the first capture mass has a molar ratio of metals M2/M3 in the range 0.05 to 2.

In a particular embodiment, the metal M1 is molybdenum, the metal M2 is cobalt and the metal M3 is nickel.

Preferably, the second capture mass has a nickel content in the range 5% to 50% by weight of NiO with respect to the total weight of the second capture mass in the oxide form before sulphurization.

Advantageously, the metals M1, M2 and M3 of the first capture mass are also sulphurized.

Preferably, the molar ratio between the sulphur (S) present on the first capture mass and the total of the metals M1, M2 and M3 is at least 60% of the theoretical molar ratio corresponding to total sulphurization of each element to the sulphide, pro rata to the relative molar fractions of each metal.

Preferably, the molar ratio between the sulphur (S) present on the second capture mass and the nickel is at least 60% of the theoretical molar ratio corresponding to total sulphurization of the nickel.

The ratio of the volume of the first capture mass to the volume of the second capture mass is generally in the range 0.2 to 5, preferably in the range 0.2 to 2.

The invention also concerns a process for the treatment of a hydrocarbon feed, comprising a process for the elimination of arsenic in accordance with the invention, in which the effluent with a reduced arsenic content is treated in a catalytic hydrotreatment step. As an example, the hydrotreatment step is a hydrodesulphurization.

DETAILED DESCRIPTION OF THE INVENTION

In the present description, the term "capture mass" may equally be replaced by equivalent terms such as: adsorption mass, trapping mass, extraction mass or metal transfer mass.

The Hydrocarbon Feed

The hydrocarbon feed which is susceptible of being treated using the process of the invention is a feed which is at least partially liquid at ambient temperature and at atmospheric pressure.

As an example, the hydrocarbon feed to be treated is a catalytically cracked gasoline obtained from catalytic cracking, thermal cracking or steam cracking units. The process may also be applied to the treatment of mixtures of straight run gasolines which might contain heavy metals obtained from crude with cracked gasolines comprising mono-olefins and diolefins. The hydrocarbon feed may contain up to 2 ppm by weight of arsenic.

As an example, the hydrocarbon feed to be treated is a catalytically cracked gasoline comprising between 5% and 60% by weight of mono-olefins, between 50 ppm and 6000 ppm of sulphur-containing compounds and between 10 and 1000 ppb of arsenic.

In the context of the invention, the arsenic may be present in the form of arsines with general formula $AsR_3$, where R is a hydrogen atom or a hydrocarbon radical such as methyl, ethyl, propyl or phenyl.

Step a) of the Process of the Invention

The process of the invention thus employs a step a) which consists of bringing the hydrocarbon feed and hydrogen into contact with a first capture mass.

This contact is carried out at an operating temperature in the range 30° C. to 400° C., at an operating pressure in the range 0.2 to 5 MPa, with a ratio of the flow rate of hydrogen to the flow rate of hydrocarbon feed in the range 2 to 800 NL/L and at an hourly space velocity with respect to the volume of the first capture mass in the range 4 to 50 $h^{-1}$. Preferably, the operating temperature is in the range 200° C. to 400° C., the ratio of the flow rate of hydrogen to the flow rate of hydrocarbon feed is in the range 50 to 800 NL/L and the hourly space velocity with respect to the volume of the first capture mass is in the range 6 to 40 $h^{-1}$.

In accordance with a highly preferred embodiment, step a) is carried out at an operating temperature in the range 200° C. to 400° C., at an operating pressure in the range 0.2 to 5 MPa, with a ratio of the flow rate of hydrogen to the flow rate of hydrocarbon feed in the range 50 to 800 NL/L and at an hourly space velocity with respect to the volume of the first capture mass in the range 10 to 25 $h^{-1}$.

Preferably, it is implemented by injecting hydrocarbon feed to be treated and hydrogen into a reactor containing said capture mass, the reactor being a fixed bed, moving bed or ebullated bed reactor, preferably a fixed bed reactor. The first capture mass comprises at least one metal M1 from group VIB and at least two metals M2 and M3 from group VIII deposited on a porous support. The molar ratio of the metals (M2+M3)/M1 is in the range 1 to 6, the quantity of metal M1 from group VIB in the oxide form is in the range 3% to 14% by weight with respect to the total weight of the first capture mass, the quantity of metal M2 from group VIII in the oxide form is in the range 1% to 20% by weight with respect to the total weight of the first capture mass and the quantity of metal M3 from group VIII in the oxide form is in the range 5% to 28% by weight with respect to the total weight of the first capture mass.

The capture mass of step a) of the invention advantageously has a molar ratio of the metals M2/M3 in the range 0.05 to 2, preferably in the range 0.08 to 1.5, still more preferably in the range 0.08 to 1.25.

Preferably, the molar ratio of the metals (M2+M3)/M1 of the first capture mass is in the range 1 to 5, preferably in the range 1 to 4.5, more preferably in the range 1.5 to 4.

Preferably, the quantity of metal M1 from group VIB in the oxide form is in the range 3% to 12% by weight with respect to the total weight of the capture mass, more preferably in the range 4% to 10% by weight and still more preferably in the range 4% to 9% by weight.

Preferably, the quantity of metal M2 from group VIII in the oxide form is in the range 1% to 15% by weight with respect to the total weight of the capture mass, preferably in the range 1% to 10% by weight, more preferably in the range 1% to 9% by weight and still more preferably in the range 2% to 5% by weight.

Preferably, the quantity of metal M3 from group VIII in the oxide form is in the range 5% to 18% by weight with respect to the total weight of the capture mass, preferably in the range 5% to 15% by weight, more preferably in the range 7% to 15% by weight, and still more preferably in the range 9% to 15% by weight.

Preferably, the metal M1 is molybdenum, the metal M2 is cobalt and the metal M3 is nickel.

The first capture mass may comprise a dopant such as phosphorus. The quantity of phosphorus in the oxide form is in the range 0.2% to 6% by weight with respect to the total weight of the first capture mass, preferably in the range 0.3% to 5% by weight and more preferably in the range 0.4% to 4% by weight.

The metals of the first capture mass are deposited on an amorphous mineral support selected from the group constituted by aluminas, silica, silica-aluminas, silicon carbide, titanium oxides used alone or as a mixture with alumina or silica-alumina, and magnesium oxides used alone or as a mixture with alumina or silica-alumina. Preferably, the support is selected from the group constituted by aluminas, silica and silica-aluminas. Highly preferably, the support is essentially constituted by at least one alumina, i.e. it comprises at least 51% by weight, preferably at least 60% by weight and highly preferably at least 80% by weight or even at least 90% by weight of alumina.

The alumina may be in various crystalline forms such as, for example, alpha alumina, beta alumina, gamma alumina, delta alumina, eta alumina, theta alumina, boehmite or mixtures thereof. The specific surface area of the support is in the range 70 to 350 m$^2$/g, preferably in the range 100 to 300 m$^2$/g, highly preferably in the range 130 to 250 m$^2$/g. The specific surface area is measured using the BET technique (ASTM standard D3663) which is well known to the skilled person.

The porosity of the support is such that it has a pore volume in the range 0.4 to 1.4 cm$^3$/g, preferably in the range 0.5 to 1.3 cm$^3$/g. The pore volume is measured by mercury porosimetry using ASTM standard D4284-92 with a wetting angle of 140°.

The metals are deposited on the support using techniques which are familiar to the skilled person, for example by impregnation using a solution of precursors of the metals, preferably by impregnation from aqueous solutions of precursors of the metals. The impregnation may, for example, be carried out using the known dry impregnation method in which the desired quantity of elements is introduced in the form of salts which are soluble in the desired solvent, for example demineralized water, in order to fill the pores of the support as precisely as possible. The support filled with solution in this manner is preferably dried.

The metals may be deposited by co-impregnation or by successive additions. Preferably M1 and M2 first followed by M3, or M3 first then M1+M2. Phosphorus may be added to the impregnation solutions. When the metal from group VIII is cobalt, cobalt nitrate, cobalt hydroxide or cobalt carbonate is advantageously used as the precursor. When the metal from group VIII is nickel, nickel nitrate, nickel hydroxide or nickel carbonate is advantageously used as the precursor. When said metal from group VIB is molybdenum, ammonium heptamolybdate or molybdenum oxide is advantageously used as the precursor. When phosphorus is present in the active phase of the first capture mass, phosphoric acid is advantageously used as the precursor. Any other salt which is known to the skilled person which has sufficient solubility in aqueous solution and which can be decomposed during a drying step or any type of oxidizing treatment may also be used.

After introducing the metals from groups VIII and VIB and optionally phosphorus, the capture mass preferably undergoes a heat treatment. This treatment is intended to transform the molecular precursors of the metals into the oxide phase. In this case it is an oxidizing treatment, but simply drying the catalytic adsorbent may also be carried out. Preferably, the first capture mass undergoes a calcining treatment prior to using it in the hydrodesulphurization process of the invention. Said calcining treatment is advantageously carried out in air or in diluted oxygen at a temperature in the range 200° C. to 550° C., preferably in the range 300° C. to 500° C.

After calcining, the metals deposited on the support are in the oxide from. Advantageously, the calcined capture mass also undergoes a sulphurization treatment before it is used in the process of the invention. Sulphurization is carried out in a sulpho-reducing medium, i.e. in the presence of H$_2$S and hydrogen, in order to transform the metallic oxides into transition metal sulphides such as MoS$_2$, Ni$_3$S$_2$ and Co$_9$S$_8$. Sulphurization is carried out by injecting a stream containing H$_2$S and hydrogen onto the capture mass or a sulphur-containing compound which can decompose into H$_2$S in the presence of capture mass and hydrogen. Polysulphides such as dimethyldisulphide are H$_2$S precursors which are routinely used for sulphurization. The temperature is adjusted so that the H$_2$S reacts with the metallic oxides to form metallic sulphides. This sulphurization may be carried out in situ or ex situ (inside or outside the reactor in which the capture reaction is carried out), at temperatures in the range 200° C. to 600° C., more preferably in the range 300° C. to 500° C. Preferably, the metals are substantially sulphurized. A metal is considered to be substantially sulphurized when the molar ratio between the sulphur (S) present on the capture mass and said metal is at least 60% of the theoretical molar ratio corresponding to total sulphurization of the metal under consideration:

$(S/\text{metal})_{capture\ mass} \geq 0.6 \times (S/\text{metal})_{theoretical}$ where:

$(S/\text{metal})_{capture\ mass}$ is the molar ratio between the sulphur (S) and the metal present on the capture mass.

$(S/\text{metal})_{theoretical}$ is the molar ratio between the sulphur and the metal corresponding to total sulphurization of the metal to a sulphide.

This theoretical molar ratio varies as a function of the metal under consideration:

$(S/Co)_{theoretical} = 8/9$
$(S/Ni)_{theoretical} = 2/3$
$(S/Mo)_{theoretical} = 2/1$ In the first capture mass comprising a plurality of metals, the molar ratio between the S present on the capture mass and all of the metals M1, M2 and M3 is at least 60%, more preferably at least 80%, of the theoretical molar ratio corresponding to total sulphurization of each metal to the sulphide, the calculation being carried out pro rata to the relative molar fractions of each metal.

Step b) of the Process of the Invention

Step b) of the dearsenification process of the invention consists of bringing the hydrocarbon feed and hydrogen into contact with a second capture mass comprising a support on which nickel is deposited and for which the quantity by weight of nickel, expressed as the oxide NiO, with respect to the total weight of the capture mass in the oxide form before sulphurization, is at least 5% by weight, preferably in the range 5% to 50% by weight and highly preferably in the range 10% to 30% by weight.

The second capture mass is employed in the sulphurized form, i.e. the molar ratio between the sulphur (S) present on the second capture mass and the element nickel is at least 60% of the theoretical molar ratio corresponding to total sulphurization of the nickel:

$(S/Ni)_{capture\ mass} \geq 0.6 \times (S/Ni)_{theoretical}$, where:

$(S/Ni)_{capture\ mass}$ is the molar ratio between the sulphur (S) and the element nickel present on the catalytic adsorbent;

$(S/Ni)_{theoretical}$ is the molar ratio between the sulphur and the element nickel corresponding to total sulphurization of nickel to the sulphide, which is equal to 2/3.

Preferably, the molar ratio between the sulphur (S) present on the second capture mass and the element nickel is at least 80% of the theoretical molar ratio corresponding to total sulphurization of the nickel.

The support is a porous support which may be selected from coal, activated coal, coke, silica, aluminas, silica-aluminas, silicates, aluminates and silico-aluminates (for example zeolitic). Preferably, the support is an α or γ alumina or a mixture of the two.

The support has a total pore volume, measured by mercury porosimetry in accordance with ASTM standard D4284-92 with a wetting angle of 140°, which is generally in the range 0.2 to 1.2 mL/g, preferably in the range 0.5 to 1.2 mL/g.

Furthermore, the support used generally has a specific surface area, determined using the ASTM method D3663, in the range 10 to 300 m$^2$/g, preferably in the range 50 to 200 m$^2$/g.

Alternatively, the capture mass may also contain elements termed "promoters" which are selected from the group formed by P, Mg, Ca, Sr, Mn, Fe, Co, Cu, Zn and Mo. The "promoter" elements are preferably present in a quantity in the range 0.1% to 2% by weight with respect to the total weight of the capture mass.

The second capture mass may be prepared using a method which comprises:

i) incorporating at least one nickel compound into a support as defined above;

ii) drying and optionally calcining the product obtained in step i) so as to at least partially transform the nickel compound or compounds which it contains into nickel oxide;

iii) bringing the product obtained in step ii), or in step i) if no step ii) has been carried out, into contact with sulphur or a compound containing sulphur in order to sulphurize the nickel deposited on the support.

Nickel may be incorporated onto the support using any method known to the skilled person, for example by impregnation using an aqueous solution containing a water-soluble nickel salt such as, for example, nickel nitrate, formate, acetate or acetylacetate. The nitrate is generally preferred due to its very high solubility. As an example, a nickel salt may be incorporated by "dry" impregnation (filling the pores of the support with a volume of liquid equal to the pore volume of the support) using a nickel nitrate solution.

Drying, which can eliminate all or a portion of the water introduced during impregnation, is preferably carried out at a temperature in the range 50° C. to 250° C., more preferably in the range 70° C. to 200° C. Drying may be carried out in air or in an inert atmosphere (for example nitrogen).

The support impregnated with nickel and dried is preferably then calcined in a stream of gas, preferably in air. The calcining temperature is generally in the range 150° C. to 450° C., preferably in the range from approximately 200° C. to approximately 400° C. The calcining period is generally in the range 0.5 hours to 24 hours, preferably 1 hour to 12 hours. The calcining step may be carried out using constant temperature stages, up to the maximum defined set point temperature.

The sulphurization step iii) is carried out in a sulphoreducing medium in order to transform the nickel oxide into nickel sulphides. Sulphurization is carried out by injecting a stream containing H$_2$S and hydrogen, or a sulphur-containing compound (for example polysulphides) which are capable of decomposing into H$_2$S in the presence of the capture mass and hydrogen, onto the capture mass. The sulphurization temperature is adjusted so that the H$_2$S reacts with the nickel oxide in order to form sulphides of nickel. This sulphurization may be carried out in situ or ex situ (inside or outside the reactor in which the second capture step takes place) at temperatures in the range 200° C. to 600° C., and more preferably in the range 300° C. to 500° C.

In accordance with the invention, the contact of step b) is carried out under the following conditions:

a temperature in the range 30° C. to 400° C., preferably in the range 200° C. to 400° C.;

a pressure in the range 0.2 to 5 MPa;

an hourly space velocity with respect to the volume of the second capture mass in the range 4 to 50 h$^{-1}$, preferably in the range 6 to 40 h$^{-1}$, more preferably in the range 10 to 25 h$^{-1}$;

a H$_2$/feed ratio in the range 2 to 800 NL/L, preferably in the range 50 to 800 NL/L.

In accordance with a first embodiment of the process of the invention, step a) is carried out before step b) and said steps are carried out either in two reactors disposed in series or in a single reactor comprising at least two fixed beds respectively comprising the first and second capture masses.

When steps a) and b) are carried out in two distinct reactors, these reactors may be fixed bed, moving bed or ebullated bed reactors, preferably fixed bed.

When steps a) and b) are carried out in the same reactor comprising two fixed beds of capture masses, the reactor is designed so that the feed of hydrocarbons to be purified encounters the first fixed bed containing the first capture mass then a second fixed bed containing the second capture mass. It should be noted that the two fixed beds may be disposed in succession, with or without a space between the two fixed beds.

Alternatively, in a second embodiment, steps a) and b) are carried out simultaneously in the same reactor, for example a fixed bed, moving bed or ebullated bed reactor, which comprises a reaction zone including a mixture of the first and second capture masses.

In accordance with the invention, the ratio of the volume of the first capture mass to the volume of the second capture mass is generally in the range 0.2 to 5, preferably in the range 0.2 to 2.

The processes of the invention are particularly suitable for pre-treating a feed containing arsenic before a catalytic hydrotreatment step, preferably a hydrodesulphurization step, in order to preserve the service life of the hydrotreatment catalyst which is generally deactivated by arsenic.

When the processes for the elimination of arsenic of the invention are employed as a pre-treatment of the hydrocarbon feed, before a hydrodesulphurization step using a bed of hydrodesulphurization catalyst, the ratio of the volume of the first capture mass and the second capture mass to the volume of hydrodesulphurization catalyst is generally in the range 0.04 to 0.5.

Further, when the pre-treatment and hydrodesulphurization steps use a fixed bed type reactor, these two steps may be carried out in the same reactor provided that the beds respectively contain the first and second capture masses disposed so that the feed to be treated encounters the beds of capture masses first, before the bed of hydrodesulphurization catalyst.

Alternatively, the first and second capture masses are mixed in the same bed, disposed upstream of the bed of hydrodesulphurization catalyst with respect to the direction of introduction of the feed to be treated.

The following examples, which are given by way of non-limiting example, illustrate the invention.

EXAMPLES

Preparation of a Capture Mass A with Nickel

The capture mass A was prepared by double dry impregnation of an aqueous solution prepared from nickel nitrate, the volume of the solution containing the metal being equal to the pore volume of the support mass.

The support was a transition alumina with a specific surface area of 135 m$^2$/g and a pore volume of 1.12 cm$^3$/g. The specific surface area of the support was measured using the BET method (ASTM standard D3663) and the pore volume was determined by mercury porosimetry using ASTM standard D4284-92 with a wetting angle of 140°.

The nickel-impregnated support was then dried for 12 hours at 120° C. then calcined in air at 500° C. for 2 hours.

After calcining, the capture mass A had a nickel content, expressed as NiO, of 18% with respect to the total weight of the capture mass.

Preparation of a Capture Mass B Comprising Nickel, Cobalt and Molybdenum

As was the case with the capture mass A, the support used for the capture mass B was a transition alumina with a specific surface area of 135 m$^2$/g and a pore volume of 1.12 cm$^3$/g. The capture mass B contains nickel, cobalt and molybdenum and was prepared by dry impregnation in two steps. The first step consisted of dry impregnation of an aqueous solution of ammonium heptamolybdate and cobalt nitrate, the volume of the solution containing the metals being rigorously equal to the pore volume of the support mass. The concentrations of the precursors of the aqueous solution were adjusted so as to deposit the desired quantities by weight on the support. The solid impregnated with molybdenum and cobalt was then dried for 12 hours at 120° C. and calcined in air at 500° C. for 2 hours. The second step was to carry out dry impregnation of an aqueous solution of nickel nitrate, the volume of the solution containing the metal being rigorously equal to the pore volume of the support mass. The concentration of precursor of the aqueous solution was adjusted so as to deposit the desired quantities by weight on the support. The solid was then dried for 12 hours at 120° C. and calcined in air at 500° C. for 2 hours.

At the end of the calcining step, a capture mass B was obtained with quantities, expressed as the % by weight with respect to the total weight of the capture mass, of 3% by weight of CoO, 10% by weight of NiO and 15% by weight of MoO$_3$.

Evaluation of the Performances of the Arsenic Capture Process in Accordance with the Invention Next, the performances of the arsenic capture process of the invention were evaluated on a gasoline cut obtained from a catalytic cracking process with a boiling point in the range 50° C. to 245° C., containing 360 ppm by weight of sulphur and doped with an arsenic-containing compound (triphenyl arsine) so as to obtain a concentration of 3000 ppb by weight of arsenic.

In Example 1 (comparative), the gasoline was treated in a pilot unit equipped with a tube reactor comprising two fixed beds of 10 mL of capture masses A, at a temperature of 250° C., a total pressure of 2 MPa with a total hourly space velocity (HSV) of 10 h$^{-1}$ (i.e. a HSV of 20 h$^{-1}$ for each of the beds of catalysts) and a H$_2$/feed ratio equal to 300 nL/L.

Before carrying out the reaction, the capture mass A was sulphurized at 350° C. in an (85/15)% vol/vol (H$_2$/H$_2$S) gas mixture.

In Example 2 (in accordance with the invention), the gasoline was treated under the same operating conditions as for Example 1, with the exception that the tube reactor was equipped with two fixed beds of 10 mL of capture masses A and B. The beds were disposed in the reactor so that the gasoline was initially brought into contact with capture mass B (1$^{st}$ bed) and then with capture mass A (2$^{nd}$ bed). Before carrying out the reaction, the capture masses A and B were also sulphurized at 350° C. in an (85/15)% vol/vol (H$_2$/H$_2$S) gas mixture.

Table 1 summarizes the operating conditions of Examples 1 and 2.

TABLE 1

|  | Example 1 (comparative) | Example 2 (in accordance with the invention) |
|---|---|---|
| 1st fixed bed | Capture mass A (18% by wt NiO/total wt of capture mass) | capture mass B (3% by wt of CoO, 10% by wt of NiO and 15% by wt of MoO$_3$/total wt of capture mass) |
| 2$^{nd}$ fixed bed | Capture mass A (18% by wt NiO/total wt of capture mass) | Capture mass A (18% by wt NiO/total wt of capture mass) |
| Temperature | 250° C. | 250° C. |
| Total pressure | 2 MPa | 2 MPa |
| Total HSV | 10 h$^{-1}$ | 10 h$^{-1}$ |
| H$_2$/feed ratio | 300 NL/L | 300 NL/L |

The quantity of arsenic in the feed and in the effluents withdrawn from the reactor was measured by atomic absorption. These values could thus be used to calculate the arsenic capture yields (HDAs).

Table 2 below indicates the breakthrough time, which corresponds to the time after which the quantity of arsenic in the effluent is 1% or more of the quantity of arsenic in the feed (C/C$_0$≥1% w/w).

TABLE 2

|  | Example 1 (comparative) | Example 2 (in accordance with the invention) |
|---|---|---|
| Breakthrough time (h) | 52 | 490 |

The results show that the process of the invention, using a specific concatenation of capture masses, can be used to capture more arsenic than the process which is not in accordance with the invention; this results in a breakthrough time multiplied by approximately 9.4.

The entire disclosures of all applications, patents and publications, cited herein and of corresponding French Application No. 13/55932, filed Jun. 21, 2013 are incorporated by reference herein.

The invention claimed is:

1. A process for the elimination of arsenic from a hydrocarbon feed which is at least partially liquid at ambient temperature and at atmospheric pressure, comprising at least the following steps:
   a) bringing the hydrocarbon feed and hydrogen into contact with a first capture mass comprising a support and at least one metal M1 from group VIB and at least two metals M2 and M3 from group VIII, the molar ratio of the metals (M2+M3)/M1 being in the range 1 to 6, the quantity of metal M1 from group VIB in the oxide form being in the range 3% to 14% by weight with respect to the total weight of the first capture mass, the quantity of metal M2 from group VIII in the oxide form being in the range 1% to 20% by weight with respect to the total weight of the first capture mass and the quantity of metal M3 from group VIII in the oxide form being in the range 5% to 28% by weight with respect to the total weight of the first capture mass;
   the contact of step a) being carried out at a temperature in the range 30° C. to 400° C., at a pressure in the range 0.2 to 5 MPa, with an hourly space velocity with respect to the volume of the first capture mass in the range 4 to 50$^{-1}$ and with a hydrogen flow rate in the range 2 to 800 liters per liter of feed;

b) bringing the hydrocarbon feed and hydrogen into contact with a second capture mass in the sulphide form comprising a support and nickel, the quantity of nickel being at least 5% by weight of NiO with respect to the total weight of the second capture mass in the oxide form before sulphurization;

the contact of step b) being carried out at a temperature in the range 30° C. to 400° C., at a pressure in the range 0.2 to 5 MPa, with an hourly space velocity with respect to the volume of the second capture mass in the range 4 to 50 h$^{-1}$ and with a hydrogen flow rate in the range 2 to 800 liters per liter;

and in which step a) is either carried out before step b) or carried out simultaneously with step b) wherein the metal M1 is molybdenum, the metal M2 is cobalt and the metal M3 is nickel.

2. The process according to claim 1, in which step a) is carried out before step b), said steps being carried out in a first and a second reaction zone respectively included in a first and second reactor.

3. The process according to claim 1, in which step a) is carried out before step b), said steps being respectively carried out in a first and a second reaction zone included in the same fixed bed reactor.

4. The process according to claim 1, in which step a) is carried out simultaneously with step b), said steps being carried out in a reactor including a reaction zone comprising a mixture of the first and second capture masses.

5. The process according to claim 1, in which the quantity of metal M1 is in the range 3% to 12% by weight, the quantity of metal M2 is in the range 1% to 15% by weight and the quantity of metal M3 is in the range 5% to 18% by weight with respect to the total weight of the first capture mass.

6. The process according to claim 1, in which the first capture mass has a molar ratio of metals M2/M3 in the range 0.05 to 2.

7. The process according to claim 1, in which the second capture mass has a nickel content in the range 5% to 50% by weight of NiO with respect to the total weight of the second capture mass in the oxide form before sulphurization.

8. The process according to claim 1, in which the metals M1, M2 and M3 of the first capture mass are sulphurized.

9. The process according to claim 8, in which the molar ratio between the sulphur (S) present on the first capture mass and the total of the metals M1, M2 and M3 is at least 60% of the theoretical molar ratio corresponding to total sulphurization of each element to the sulphide, pro rata to the relative molar fractions of each metal.

10. The process according to claim 1, in which the molar ratio between sulphur (S) present on the second capture mass and the nickel is at least 60% of the theoretical molar ratio corresponding to total sulphurization of the nickel.

11. The process according to claim 1, in which the ratio of the volume of the first capture mass to the volume of the second capture mass is in the range 0.2 to 5, preferably in the range 0.2 to 2.

12. The process according to claim 1, in which the effluent with a reduced arsenic content obtained from steps a) and b) is treated in a catalytic hydrotreatment step.

* * * * *